United States Patent
Bender et al.

(10) Patent No.: US 7,487,807 B2
(45) Date of Patent: *Feb. 10, 2009

(54) VISUAL FUEL SYSTEM FOR AN ENGINE WELDER

(75) Inventors: David J. Bender, Chardon, OH (US); Jason R. Stapp, Willoughby, OH (US)

(73) Assignee: Lincoln Global, Inc., City of Industry, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 11/497,711

(22) Filed: Jul. 28, 2006

(65) Prior Publication Data
US 2007/0000565 A1    Jan. 4, 2007

Related U.S. Application Data

(62) Division of application No. 10/746,614, filed on Dec. 24, 2003, now Pat. No. 7,188,645.

(51) Int. Cl.
*B65B 1/04* (2006.01)

(52) U.S. Cl. .................. 141/95; 220/86.1; 219/133

(58) Field of Classification Search ............... 141/94, 141/95, 198, 391; 220/86.1, 86.2; 116/108–112, 116/227, 228, 264, 70; 219/133
See application file for complete search history.

(56) References Cited

U.S. PATENT DOCUMENTS 1,929,887 A    10/1933   Gustafson
2,157,871 A    5/1939    Steinert
2,177,687 A    10/1939   Bracken et al.
2,508,124 A    5/1950    Stephenson
2,836,736 A    5/1958    Johnson
2,999,950 A    9/1961    Johnson (Continued)

FOREIGN PATENT DOCUMENTS

CA    2316598    3/2001

(Continued)

OTHER PUBLICATIONS

Commander 500 Operator's Manual, Copyright 2002, Lincoln Electric.

*Primary Examiner*—Steven O Douglas
(74) *Attorney, Agent, or Firm*—Fay Sharpe LLP; Brian E. Turung

(57) ABSTRACT

A fueling assembly for a fuel tank positioned in an engine driven welder. The fueling assembly includes a filler tube, a fuel level monitor and a grommet. The filler tube has a bottom portion and a top portion. The bottom portion of the filler tube has a cross-sectional area that is greater that any region in the top portion of the filler tube. The fuel level monitor includes a fuel level sensor position in the fuel tank and/or filler tube. The fuel level monitor includes a fuel level indicator positioned on a side of the housing so as to enable an operator to simultaneously view the fuel level indicator and the opening used to direct fuel into the filler tube during the filling of the fuel tank. The grommet at least partially seals the tube access opening to inhibit fluids entering the interior of the housing of the engine driven welder.

33 Claims, 10 Drawing Sheets

U.S. PATENT DOCUMENTS

| | | | |
|---|---|---|---|
| 3,125,671 A | 3/1964 | Manz | |
| 3,227,979 A | 1/1966 | Kamp | |
| 3,659,183 A | 4/1972 | Carlson | |
| 3,720,842 A | 3/1973 | Martin et al. | |
| 3,781,139 A | 12/1973 | Lohse | |
| 4,252,245 A | 2/1981 | Kudo | |
| 4,465,920 A | 8/1984 | Hoyt, Jr. et al. | |
| 4,595,841 A | 6/1986 | Yaguchi | |
| 4,702,201 A | 10/1987 | Odo et al. | |
| 4,703,867 A | 11/1987 | Schoenhard | |
| 4,759,458 A | 7/1988 | Fischer | |
| 4,768,566 A | 9/1988 | Ito et al. | |
| 4,798,182 A | 1/1989 | Ebinuma et al. | |
| 4,997,013 A | 3/1991 | Peckels | |
| 5,033,521 A | 7/1991 | Martin | |
| 5,094,315 A | 3/1992 | Taki et al. | |
| 5,127,432 A | 7/1992 | Duhaime et al. | |
| 5,133,588 A | 7/1992 | Hutchinson et al. | |
| 5,183,087 A | 2/1993 | Aubel et al. | |
| 5,275,213 A | 1/1994 | Perkins | |
| 5,291,032 A | 3/1994 | Vali et al. | |
| 5,320,147 A | 6/1994 | Jamrog | |
| 5,344,038 A | 9/1994 | Freeman et al. | |
| 5,385,178 A | 1/1995 | Bedi | |
| 5,390,808 A | 2/1995 | Choma et al. | |
| 5,437,317 A | 8/1995 | Takatsuka et al. | |
| 5,590,806 A | 1/1997 | Green et al. | |
| 5,662,149 A | 9/1997 | Armellino | |
| 5,718,471 A | 2/1998 | McHorse | |
| 5,738,380 A | 4/1998 | Zipser et al. | |
| 5,928,535 A | 7/1999 | Trinkner et al. | |
| 5,990,447 A | 11/1999 | Nowak et al. | |
| 6,033,006 A | 3/2000 | Bovellan et al. | |
| 6,051,809 A | 4/2000 | Colella | |
| 6,099,265 A | 8/2000 | Rowe, Jr. et al. | |
| 6,172,332 B1 | 1/2001 | Trinkner | |
| 6,194,682 B1 | 2/2001 | Schneider | |
| 6,263,926 B1 | 7/2001 | Bender et al. | |
| 6,296,027 B1 | 10/2001 | Bender et al. | |
| 6,331,694 B1 | 12/2001 | Blankenship | |
| 6,472,635 B2 | 10/2002 | Trinkner et al. | |
| 6,534,958 B1 | 3/2003 | Graber et al. | |
| 6,596,972 B1 | 7/2003 | Di Novo et al. | |
| 6,619,337 B1 | 9/2003 | Vickers | |
| 6,660,967 B2 | 12/2003 | Brofft et al. | |
| 6,670,580 B2 | 12/2003 | Brofft et al. | |
| 6,674,046 B2 | 1/2004 | Bankstahl et al. | |
| 6,708,736 B2 | 3/2004 | Bender | |
| 6,992,265 B2 | 1/2006 | Bender | |
| 2003/0080101 A1 | 5/2003 | Flood et al. | |
| 2003/0155337 A1 | 8/2003 | Rice et al. | |
| 2004/0104209 A1 | 6/2004 | Bankstahl et al. | |
| 2004/0182846 A1 | 9/2004 | Silvestro | |

FOREIGN PATENT DOCUMENTS

| | | |
|---|---|---|
| CA | 2446077 | 11/2002 |
| CA | 2453590 | 9/2004 |
| DE | 2353448 | 4/1975 |
| DE | 3739726 | 9/1989 |
| FR | 2 331 414 | 7/1977 |
| GB | 1323751 | 7/1973 |
| GB | 1590043 | 5/1981 |
| WO | WO 02/36948 | 5/2002 |

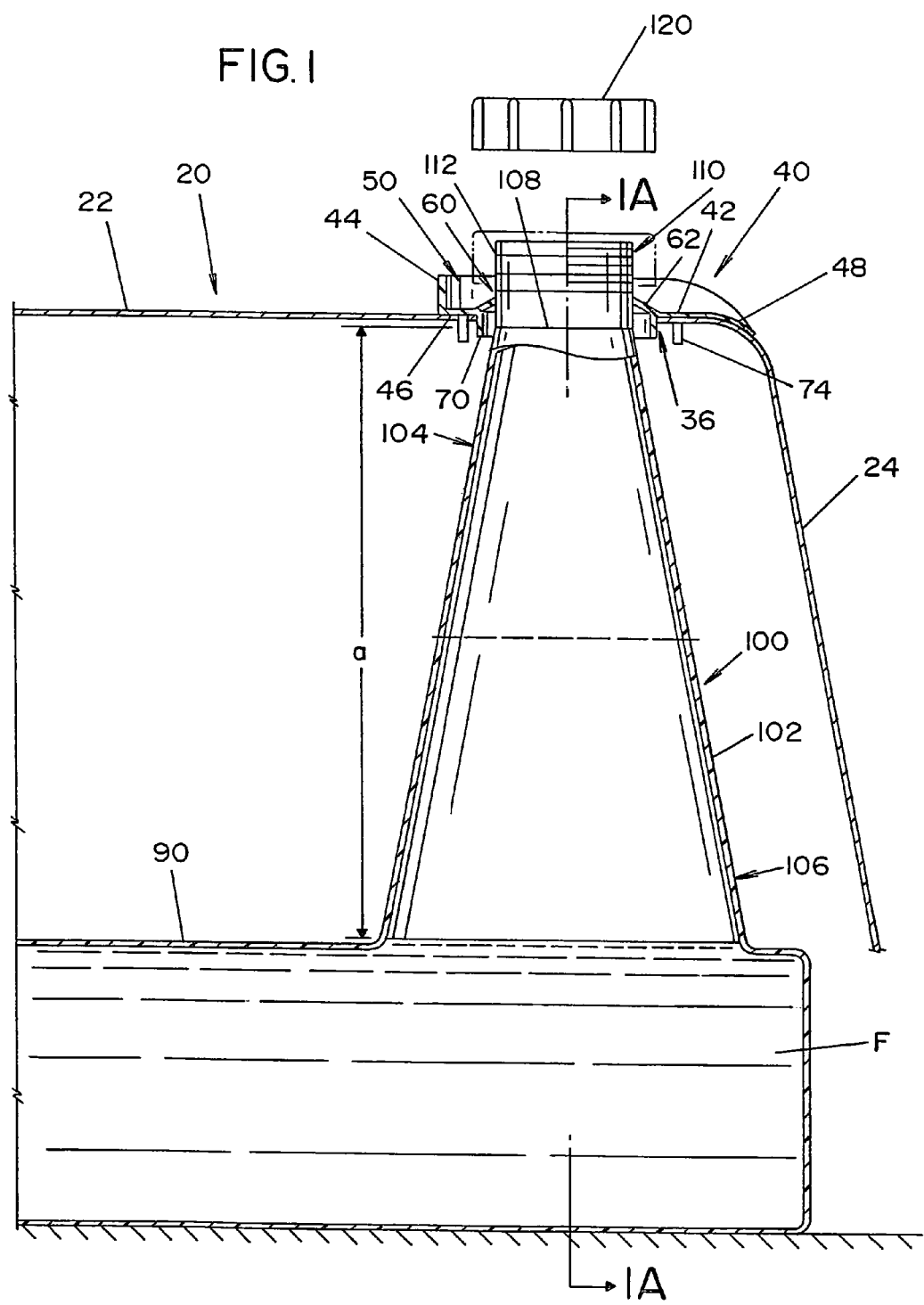

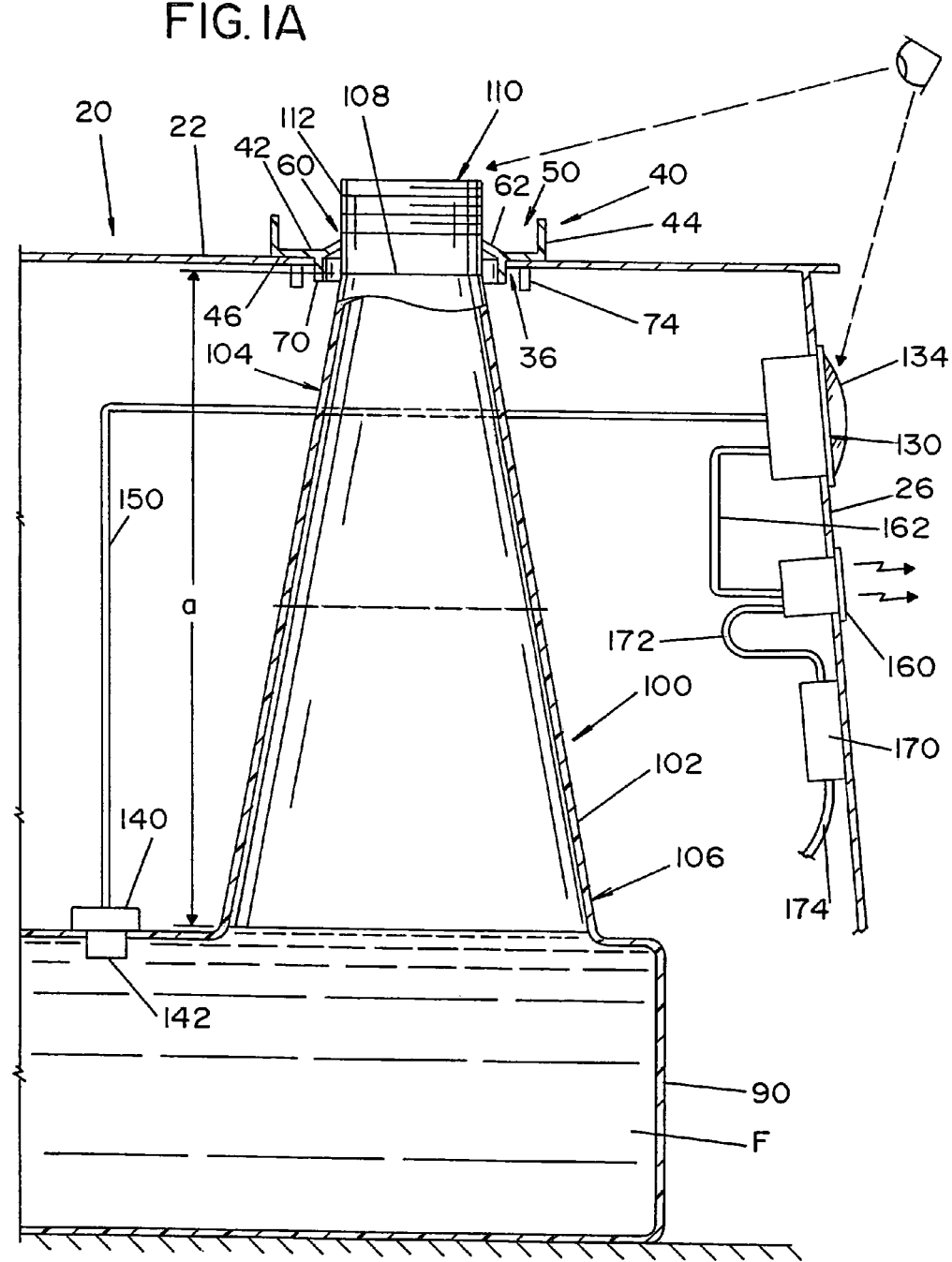

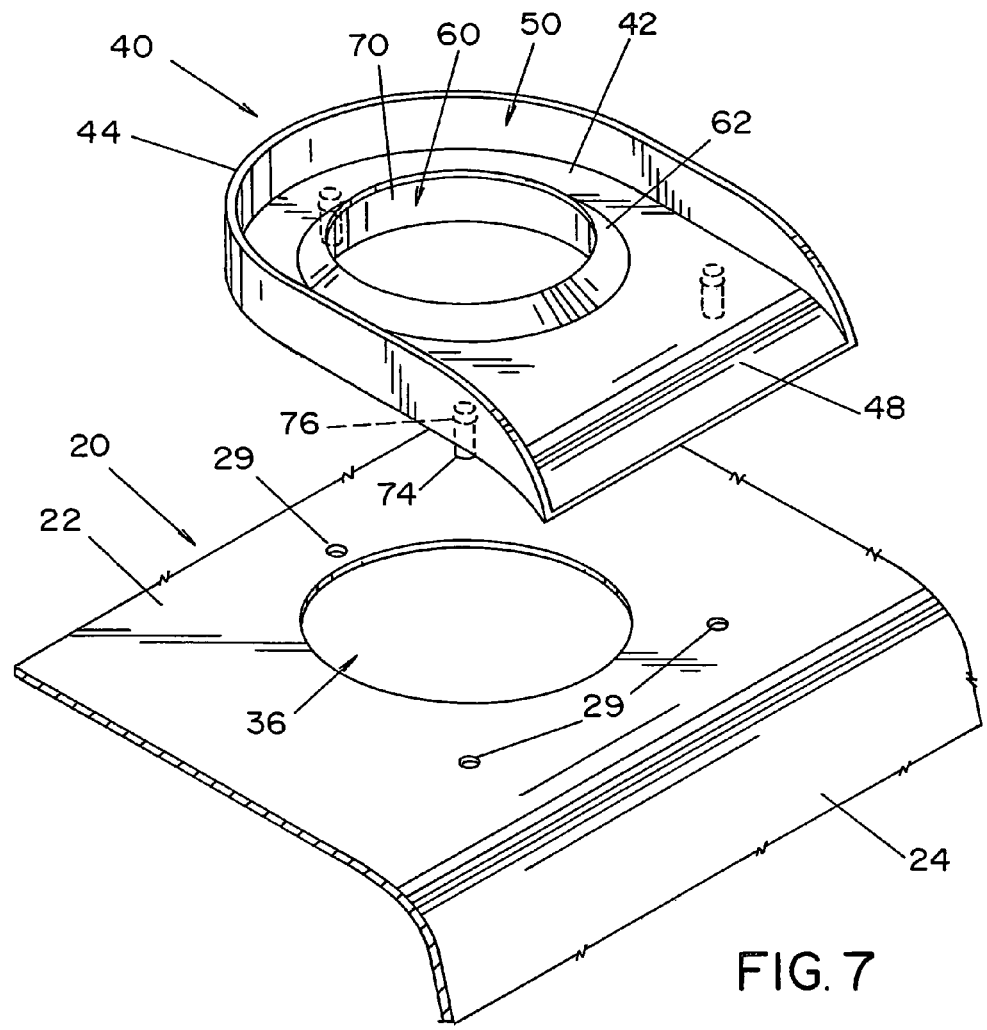
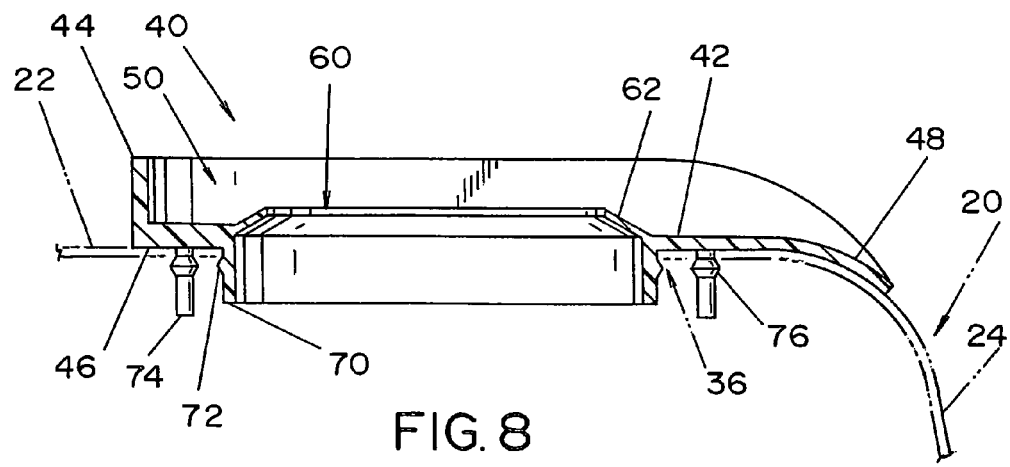

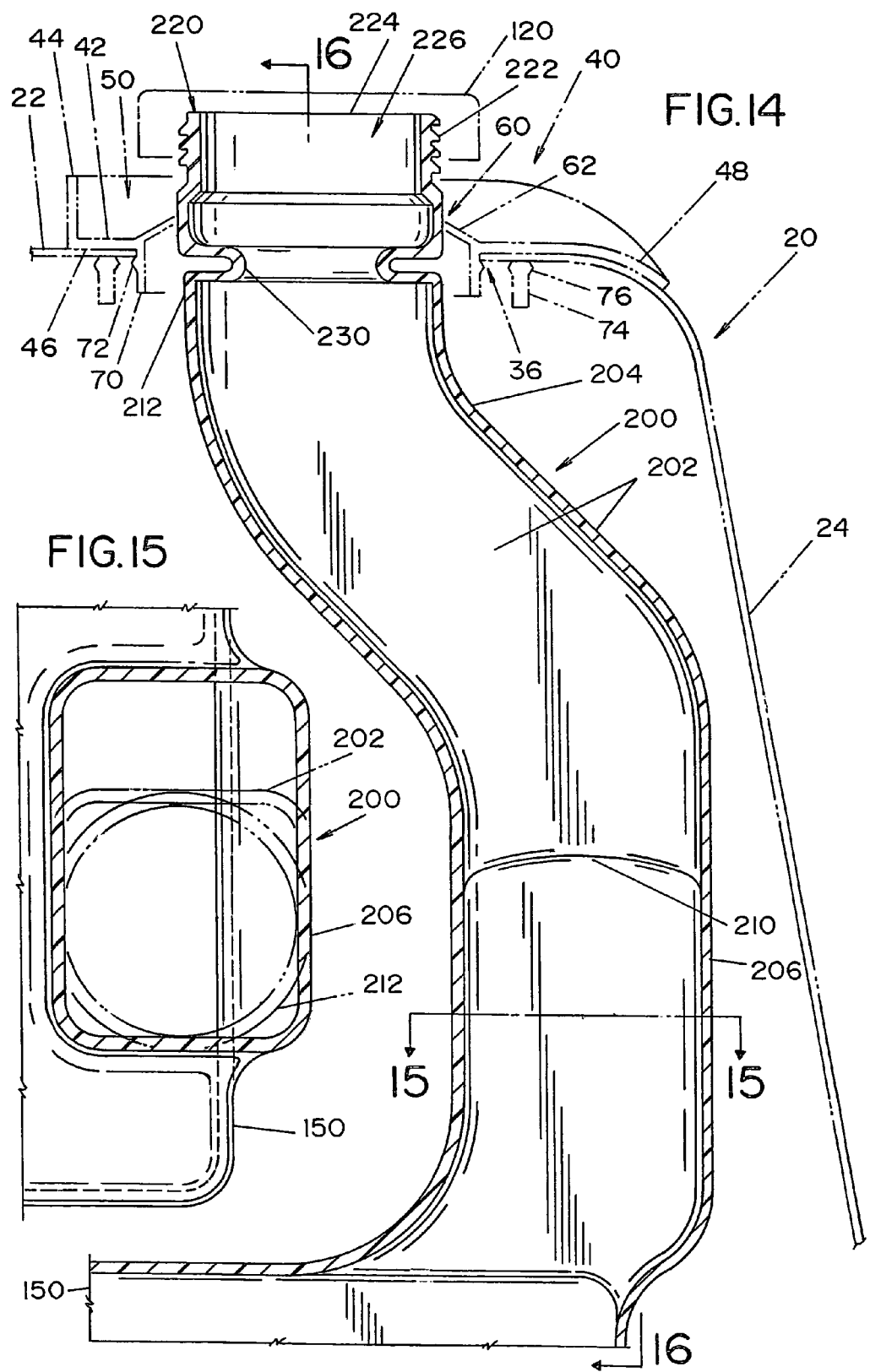

VISUAL FUEL SYSTEM FOR AN ENGINE WELDER

The present invention is a divisional of U.S. patent application Ser. No. 10/746,614 filed Dec. 24, 2003 now U.S. Pat. No. 7,188,645.

BACKGROUND OF THE INVENTION

This invention pertains to engine driven welding machines, and more particularly to arrangements for filling the fuel tanks of welding machine engines.

INCORPORATION BY REFERENCE

U.S. Pat. Nos. 5,928,535; 6,172,332; 6,263,926; 6,296,027 and 6,472,635; U.S. patent application Ser. No. 10/099,677 filed Mar. 14, 2002; and the Operator's Manual for the RANGER 9 are incorporated herein by reference and illustrate various types of grommets that can be used fuel assembly arrangements for engine welders.

BACKGROUND OF THE INVENTION

Engine driven welding machines include a gas powered engine to run a generator which supplies power to the welding electrode. Consequently, the fuel tank for the gas powered engine must be periodically refilled with fuel. Years ago, the gas tank opening for the engine welder was located at or near the base of the engine welding machine. This position of the gas tank opening of the welder had several disadvantages, one which was that an operator was required to bend down to the ground to open, fill and then reseal the gas tank. This problem was solved by the RANGER 8 and 9 sold by The Lincoln Electric Company. The RANGER 8 and 9 included a cut out in the top cover of the engine welder to allow a filler tube to project therethrough. The filler tube extended to the fuel tank located in the base of the engine welder. As a result, an operator could fill the fuel tank without having to bend down to the ground.

Another disadvantage of prior engine welder fuel assemblies was that the close proximity of the gas tank opening to the top of the gas tank provided little, if any, warning to the operator during fueling that the gas tank was approaching a full condition. This problem was also solved by the RANGER 8 and 9. The fuel tank of the RANGER 8 and 9 was located at the base of the engine welder housing and the filler tube opening was located above the top cover of the engine welder housing. As a result, the longer filler tube provided additional warning time to an operator during the filling of the fuel tank. In addition, the filler tube volume was larger volume near the fuel tank than at the filler tube opening. This variable volume of the filler tube also provided the operator additional warning that the fuel tank was approaching a full condition.

Prior engine welders had the further disadvantage of allowing fuel that spilled on the welder during fueling to flow all over the top and/or side surface of the engine welder housing. Such fuel spillage could result in the defacing of the engine welder housing and/or damage to the internal components of the engine welder. Once again this problem was overcome by the RANGER 8 and 9. The RANGER 8 and 9 incorporated the use of a grommet prevented fuel from leaking into the interior of the engine welder housing. The grommet was also designed to controllably direct any spilled fuel off to the side of the engine welder housing.

Although the fuel assembly design of the RANGER 8 and 9 has been commercially successful, monitoring of the fuel level in the fuel tank during operation of the engine welder and during the filling of the fuel tank remained as issues for the engine welder. In order to address these issues, The Lincoln Electric Company developed a new fuel tank assembly which incorporated the use of a fuel gauge. This fuel tank assembly is disclosed in U.S. Pat. Nos. 6,263,926 and 6,296,027, which are incorporated herein by reference. The fuel gauge is positioned adjacent to the filler tube and allows an operator to monitor the fuel level in the fuel tank during the filling of the fuel tank and during the operation of the engine welder. As a result, the operator is better able to determine when refueling is required and when fueling can be terminated during a refueling procedure. A grommet was again used to seal the cut out region about the filler tube. A portion of the top and adjacent side of the engine welder is cut out and the grommet is positioned in the cut-out region to reseal the top and side of the engine welder. The opening of the filler tube extends through the bottom of the grommet. The cavity of the grommet directed spilled fuel during the fueling procedure to one side of the engine welder. The grommet, like all grommets, was designed to maintain a seal between the filler tube and the grommet during the operation of the engine welder. The grommet also allowed for easy removal and cleaning during the periodic servicing of the engine welder.

Although the fueling assembly disclosed in Assignee's U.S. Pat. Nos. 6,263,926 and 6,296,027 and U.S. patent application Ser. No. 10/099,677 filed Mar. 14, 2002 addressed many of the past problems associated with the fueling of engine welders, there remains a need for a fuel assembly for an engine welder simplifies the fuel process, enables an operator to easily and conveniently refuel a tank and monitor the fueling progress, and enables an operator to easily and conveniently monitor fuel level in the fuel tank and refuel the tank in a variety of environments.

SUMMARY OF THE INVENTION

The present invention relates to a fueling assembly for a housed engine, and more particularly, to an improved grommet for the filler tube opening in the housing of an engine welder; however, the invention is not limited to engine welders, and can be used in all types of mechanisms that include a gas powered engine.

In accordance with a principal aspect of the present invention, an engine driven device is provided which includes a housing to at least partially protect the internal components of the engine. The engine driven device may include one or more other components at least partially in the housing. One type of engine driven device that is particularly applicable to the present invention is an engine driven welder. Typically, an engine driven welder includes a housing to protect the internal components of the welder. Protected by the housing is a fuel powered engine and an electric generator. The fuel powered engine runs the electric generator which in turn produces electricity for the arc welder. The electric generator is selected to produce electricity for various types of welders, such as, but not limited to, TIG welders, plasma arc welders, MIG welders, STT welders, and the like. Electric circuitry can be included within the housing to control the amount of current, voltage, power and/or the waveform of current directed to the electrode of the welder. A fuel tank is provided within the housing to supply fuel to the fuel powered motor. The fuel tank can be positioned in various areas within the housing, but is typically positioned at or near the base of the housing of the engine driven welder. A filler tube is connected to a portion of the fuel tank and extends upwardly from the fuel tank and through a portion of the housing to enable an operator to refill the fuel tank. The filler tube and fuel tank can be made from one or multiple pieces of material. The filler tube and fuel tank are typically made of a durable material such as, but not limited to, a plastic and/or a metal material. The engine welder typically includes a control panel to operate various internal components of the welder and to provide connectors to various components of the welder. One or more fixed or adjustable exhaust pipes for the fuel powered engine are also included on the engine driven welder. The one or more exhaust pipes can extend vertically upward or be oriented at some other angle. These and other standard components of an engine driven welder are disclosed in U.S. Pat. Nos. 5,928,535; 6,172,332; 6,263,926; 6,296,027; and 6,596,972, which are incorporated herein by reference. The engine driven welder is typically transported by a welding carriage. One particular welding carriage which can be used is disclosed in Assignee's U.S. patent application Ser. No. 09/411,106, filed Oct. 4, 1999, which is incorporated herein by reference. In one embodiment of the invention, the filler tube and fuel tank arrangement includes a fuel gauge. The fuel gauge enables an operator to monitor fuel levels within the filler tube and/or fuel tank, enables an operator to anticipate when the engine driven welder needs to be refueled, and/or notifies an operator during the refueling process when the fuel tank is filled. In one aspect of this embodiment, the fuel gauge is designed to notify an operator during the refueling process of the fuel level within the fuel tank and/or filler tube, to enable an operator to cease the fueling operation when the fuel tank is properly filled. In another and/or alternative aspect of this embodiment, the fuel gauge is designed to monitor the fuel level within the fuel tank to inform an operator of the current fuel level within the fuel tank. In one particular non-limiting design, a portion of the fuel gauge extends into the fuel tank to allow for fuel level monitoring within the fuel tank. In still another and/or alternative aspect of this embodiment, the fuel level monitor includes a fuel level indicator that registers at least one fuel level. In one particular non-limiting design, the fuel level indicator indicates multiple fuel levels within the fuel tank (e.g., full, empty, ¼-filled, etc). In yet another aspect of this embodiment, the fuel level monitor includes a fuel level indicator and a fuel level sensor assembly, which fuel level sensor assembly at least partially extends the length of the filler tube. In one particular non-limiting design, the fuel level sensor assembly incorporates mechanical, electrical and/or chemical mechanisms to at least partially sense the fuel level in the fuel tank. In another particular non-limiting design, the fuel level sensor assembly includes a mechanical float to at least partially sense the fuel level in the fuel tank.

In accordance with another and/or alternative aspect of the present invention, a tube access opening is positioned in a top region of the housing of the engine driven device such as, but not limited to, an engine driven welder. The tube access opening is designed to provide access to an opening used to fill a fuel tank via the filler tube. In one embodiment of the invention, the tube access opening is positioned at least closely adjacent to a side edge of the housing. In another and/or alternative embodiment of the invention, the tube access opening is position closely adjacent to the front panel of the engine welder. In still another and/or alternative embodiment of the invention, the tube access opening is positioned fully within the top region of the housing.

In accordance with still another and/or alternative aspect of the present invention, the filler tube includes a top portion and a bottom portion, wherein the bottom portion can be uniformly formed with the fuel tank or sealed to the fuel tank by various means such as, but not limited to, welding, bolting, adhesives, and/or the like. The cross-sectional area of the filler tube is sufficiently large to inhibit or prevent rapid back flow of fuel in the filler tube when filling the tank. In one embodiment of the invention, the cross-sectional area of the filler tube at least partially decreases from the bottom portion to the top portion of the filler tube. The decrease in cross-sectional area can occur along the complete length of the filler tube or only along a portion of the filler tube. The filler tube is designed so as to not to significantly increase in cross-sectional area from the bottom portion to the top portion of the filler tube. Typically, the filler tube does not increase in cross-sectional area from the bottom portion to the top portion of the filler tube. As defined in the present invention, an insignificant increase in cross-section area results in a volume increase per longitudinal inch of filler tube of less than about 1.2 occurring near the top of the top portion (e.g., within 3-4 inches of the top of the top portion), and typically a volume increase of less than about 1.15. For instance, the top portion of the filler tube may have a generally rectangular cross-section shape; however, 3 inches from the top of the top portion of the filler tube the cross-sectional shape of the top portion transforms to a circular cross-sectional shape to accommodate a circular cap or other circular component (e.g., circular top fill section, etc.). In this non-limiting example, the generally rectangular cross-section shaped section is about 3 inches wide and 2.25 inches deep and the circular cross-sectional shape has a diameter of 3 inches. The cross-sectional area of the generally rectangular section is 6.75 inches and the cross-sectional area of the circular section is about 7.1 inches. This nominal increase in cross-sectional area from 6.75 to 7.1 due to the transition in shape of the top portion within three inches of the top constitutes a insignificant of increase of about 1.05 (7.1/6.75=1.05). In one aspect of this embodiment, the filler tube exhibits a decrease in cross-sectional area within the in the bottom portion of the filler tube and the cross-sectional area in the upper half of the filler tube remains substantially constant. In another and/or alternative aspect of this embodiment, the filler tube exhibits a decrease in cross-sectional area within the in the lower third of the filler tube and the cross-sectional area in the upper two-thirds of the filler tube remains substantially constant. In still another and/or alternative aspect of this embodiment, the filler tube exhibits a decrease in cross-sectional area within the in the upper half of the filler tube and the cross-sectional area in the lower half of the filler remains substantially constant. In yet another and/or alternative aspect of this embodiment, the filler tube exhibits a decrease in cross-sectional area within the in the upper one third of the filler tube and the cross-sectional area in the lower two thirds of the filler remains substantially constant. In still yet another and/or alternative aspect of this embodiment, the filler tube exhibits a continuous decrease in cross-sectional area from the bottom to the top of the filler tube. In another and/or alternative embodiment of the invention, the filler tube includes a larger cross-sectional area in the bottom portion of the filler tube than in the top portion of the filler tube. In this embodiment, the largest cross-sectional area exist at the point the filler tube contacts the fuel tank. The cross-sectional area of the bottom portion can remain constant along the longitudinal length of the bottom portion of the filler tube. Alternatively, the cross-sectional area of the bottom portion can constantly or periodically decrease along the longitudinal length of the bottom portion of the filler tube. The large cross-sectional area of the filler tube is designed to reduce the rate at which the fuel rises in the filler tube after the fuel tank is filled. The reduced rate at which the fuel initially rises in the filler tube as a result of the larger volume of the bottom portion of the filler tube allows an operator more time to terminate the flow of fuel into the filler tube once the operator is notified or learns from the fuel level indicator that the fuel tank is filled so as to prevent back flow or back splash of the fuel in the filler tube. The reduced rate at which the fuel rises in the filler tube is achieved due to the larger volume of the filler tube in the low portion of the filler tube. The larger volume requires more time to be filled, thus reducing the rate at which this section of the filler tube is filled with fuel. The size and shape of the enlarged portion of the filler tube can have a variety of shapes and sizes (e.g. funneled shaped, spherical shaped, cubic shaped, block shaped, etc.). In still another and/or alternative embodiment of the invention, the cross-section area of the filler tube that is connected to the fuel tank is at least about 1.5 times greater that the smallest cross-section area of the fuel tube that is located at or closely adjacent to the top end of the top portion of the filler tube. In one aspect of this embodiment, the cross-section area of the filler tube that is connected to the fuel tank is at least about 2 times greater that the smallest cross-section area of the fuel tube that is located at or closely adjacent to the top end of the top portion of the filler tube. In another and/or alternative aspect of this embodiment, the cross-section area of the filler tube that is connected to the fuel tank is at least about 2.5 times greater that the smallest cross-section area of the fuel tube that is located at or closely adjacent to the top end of the top portion of the filler tube. In still another and/or alternative aspect of this embodiment, the cross-section area of the filler tube that is connected to the fuel tank is at least about 3 times greater that the smallest cross-section area of the fuel tube that is located at or closely adjacent to the top end of the top portion of the filler tube. In yet another and/or alternative aspect of this embodiment, the cross-section area of the filler tube that is connected to the fuel tank is at least about 4 times greater that the smallest cross-section area of the fuel tube that is located at or closely adjacent to the top end of the top portion of the filler tube. In a further and/or alternative aspect of this embodiment, the cross-section area of the filler tube that is connected to the fuel tank is at least about 6 times greater that the smallest cross-section area of the fuel tube that is located at or closely adjacent to the top end of the top portion of the filler tube. In a still further and/or alternative aspect of this embodiment, the cross-section area of the filler tube that is connected to the fuel tank is at least about 8 times greater that the smallest cross-section area of the fuel tube that is located at or closely adjacent to the top end of the top portion of the filler tube. In yet another and/or alternative embodiment of the invention, the volume of the bottom portion of the filler tube is at least about 1.2 times greater that the volume of the top portion of the filler fuel tube. Typically, the bottom portion of the of the filler tube is located in the lower 40-60 percent of the longitudinal length of the filler tube. In one aspect of this embodiment, the volume of the bottom portion of the filler tube is at least about 1.3 times greater that the volume of the top portion of the filler fuel tube. In another and/or alternative aspect of this embodiment, the volume of the bottom portion of the filler tube is at least about 1.4 times greater that the volume of the top portion of the filler fuel tube. In still another and/or alternative aspect of this embodiment, the volume of the bottom portion of the filler tube is at least about 1.5 times greater that the volume of the top portion of the filler fuel tube. In yet another and/or alternative aspect of this embodiment, the volume of the bottom portion of the filler tube is at least about 1.6 times greater that the volume of the top portion of the filler fuel tube. In still yet another and/or alternative aspect of this embodiment, the volume of the bottom portion of the filler tube is at least about 1.8 times greater that the volume of the top portion of the filler fuel tube. In a further and/or alternative aspect of this embodiment, the volume of the bottom portion of the filler tube is at least about 2 times greater that the volume of the top portion of the filler fuel tube. In still a further and/or alternative aspect of this embodiment, the volume of the bottom portion of the filler tube is at least about 2.2 times greater that the volume of the top portion of the filler fuel tube. In yet a further and/or alternative aspect of this embodiment, the volume of the bottom portion of the filler tube is at least about 2.4 times greater that the volume of the top portion of the filler fuel tube. In still yet a further and/or alternative aspect of this embodiment, the volume of the bottom portion of the filler tube is at least about 2.6 times greater that the volume of the top portion of the filler fuel tube. In another and/or alternative aspect of this embodiment, the volume of the bottom portion of the filler tube is at least about 3 times greater that the volume of the top portion of the filler fuel tube. In still yet another and/or alternative embodiment, the cross-sectional area of the filler tube continuously decreases over a majority of the length of the filler tube from the fuel tank to the top opening of the filler tube. In one aspect of this embodiment, the cross-sectional area of the filler tube substantially uniformly decreases over a majority of the length of the filler tube. In yet another and/or alternative aspect of this embodiment, a portion of the filler tube extends from the interior of the housing and to a point at least closely adjacent to the tube access opening. In one non-limiting design, the top of the filler tube is positioned even with or slightly below the tube access opening. In another non-limiting design, the top of the filler tube is positioned above the tube access opening. In still yet another and/or alternative embodiment of the invention, a top fill section is connected to the top end portion of the filler tube. The top fill section typically includes a connection arrangement (e.g., thread, grove, latch, rib, etc.) that enables a removable cap to the connected to the opening in the top fill section. The use of a removable cap enables an operator to open and close the opening on the top fill section. In one aspect of this embodiment, the cap allows fumes to escape through the cap when the pressure within the filler tube exceeds a predetermined pressure. This design of the cap helps to inhibit or prevent high pressures from building up within the filler tube and/or fuel tank. In another and/or alternative aspect of this embodiment, the top of the cap, when the cap is inserted on opening of the top fill section, is level with or above the housing surface. In a further and/or alternative embodiment of the invention, a top fill section includes a recess opening used to facilitate in the holding a pump nozzle of a fuel pump. The size of the recess opening is selected to accommodate certain types of fuel nozzles. Fuel nozzles for gasoline have a smaller nozzle diameter than fuel nozzles for diesel fuel. As such, gas engine welders typically have a smaller recess opening than diesel engine welders. The design of the recess opening is generally similar to those used on automobiles; however, other designs can be used. In still a further and/or alternative embodiment of the invention, the filler tube is configured to bypass the components inside the housing of the engine driven device.

In accordance with still another and/or alternative aspect of the present invention, a fuel level indicator of the fuel level monitor is located on the housing of the engine welder at a pointed spaced from the filler tube. The fuel level indicator can include a visual indicator (e.g., gauge, light, analog display, digital display, etc.) and/or an audible indicator (e.g., buzzer, bell, speaker, etc.). Typically the fuel level indicator is located in the front panel of the engine welder; however, the fuel level indicator can be located in other areas (e.g., housing side, housing top, etc.). The positioning of the fuel level indicator on the front panel of the engine welder results in the fuel level indicator being in a location that is always accessible during the operation of the engine welder. The front panel of the engine welder includes the controls, meters and connection points for the engine welder. As such, the front panel must be accessible to an operator during the operation of the engine welder. One or more sides of the engine welder may not be accessible if the engine welder is positioned against a wall or side of a vehicle. In one embodiment, the fuel level indicator includes a gauge. In another and/or alternative embodiment, the fuel level indicator includes a gauge and a buzzer. In another and/or alternative embodiment of the invention, the fuel level indicator is located on the engine welder in a region that is close to the tube access opening for the filler tube or the top fill section on the filling tube. The close proximity of the fuel level indicator to the tube access opening enables an operator to fill the fuel tank and view the opening in the top portion of the filler tube or opening of the top fill section while also being able to view and/or hear the fuel level indicator during the fueling process. The simultaneous ability to view the opening of filler tube or the top fill section and view and/or hear the fuel level indicator enables the operator to better monitor the fueling operation. In one aspect of this embodiment, the fuel level indicator is positioned on the front panel of the engine welder and the tube access opening is positioned on the top of the housing near the front edge of the engine welder. In one non-limiting design, the tube access opening is positioned about 0.25-3 feet from the front edge of the engine welder and up to about 2 feet from a side edge of the housing of the engine welder. In still another and/or alternative embodiment of the invention, the fuel level monitor is partially or fully powered by the electricity generated during the operation of the engine welder. During the operation of the engine welder, a fuel powered engine runs an electric generator which in turn produces electricity for the arc welder. A portion of the produced electricity is directed to the fuel level monitor to enable operation of the monitor. Typically, the current from the electric generator is passed through a circuit to obtain the desired current and voltage for the proper operation of the fuel level monitor. In still another and/or alternative embodiment of the invention, the fuel level monitor is partially or fully powered by a power source other than the electric generator that is powered by the engine welder. Such other power sources include, but are not limited to, a battery, solar cell and/or fuel cell. The use of these power sources enables the fuel level monitor to be used even when the motor to the engine welder is not operating. In certain instances, it may not be desirable or possible to operate the motor of the engine welder during the refilling of the fuel tank. As such, if the fuel level monitor is powered solely by the electric generator of the engine welder, the fuel level monitor will not operate during the filling of the fuel tank when the engine welder is turned off. The use of a battery, solar cell, fuel cell and/or other power source enable the operation of the fuel level monitor during the filling of the fuel tank when the engine welder is turned off. The use of the battery, solar cell, fuel cell and/or other power can be the sole, primary (e.g., battery, solar cell and/or fuel cell the primary power source and electric generator the secondary power source) or secondary power source (e.g. the electric generator is the primary power source and the battery, solar cell and/or fuel cell the secondary power source) of the fuel level monitor. When a battery is used, the battery is typically a rechargeable battery; however, this is not required. The rechargeable battery, when used, can be recharged by the electric generator, solar cell, etc. In still yet another and/or alternative embodiment of the invention, the fuel level monitor includes a fuel level sensor assembly that monitors and/or detects a fuel level in the fuel tank and/or filler tube and sends such information to the fuel level indicator. The fuel level sensor assembly can be designed to measure the fuel level within the fuel tank and/or filler tube by a mechanical, chemical and/or electrical sensing arrangement. In one aspect of this embodiment, the fuel level sensor assembly is at least partially located in the fuel tank and is designed to measure at least one fuel level in the fuel tank. In another and/or alternative aspect of this embodiment, the fuel level sensor assembly is at least partially located in the fuel tank and is designed to measure a plurality of fuel levels in the fuel tank. In still another and/or alternative aspect of this embodiment, the fuel level sensor assembly is at least partially located in the filler tube and is designed to measure at least one fuel level in the filler tube. In yet another and/or alternative aspect of this embodiment, the fuel level sensor assembly is at least partially located in the filler tube and is designed to measure a plurality of fuel levels in the filler tube.

In accordance with yet another and/or alternative aspect of the present invention, a grommet is provided to be at least partially inserted in the tube access opening of the housing of the engine driven device. In one embodiment of the invention, the grommet is designed to at least partially seal the region about the tube access opening to inhibit and/or prevent fluids from entering the interior of the housing of the engine driven device. The tube access opening in the housing is generally located on the top of the housing of the engine welder; however, a portion of the tube access opening can be located on the side of the housing of the engine welder. The grommet is designed to cover all or substantially all of the tube access opening. In one aspect of this embodiment, the outer edges of the grommet overlie the edges of the tube access opening to form a partial seal between the grommet and surface of the housing. The partially seal inhibits or prevents fluids from entering the interior of the housing through the tube access opening. The outer edges can be partially or completely secured to the surface of the housing to facilitate in the sealing action. The outer edges can be removably or irremovably secured to the housing surface by a variety of arrangements such as, but not limited to, adhesives, hook and loop fasteners, snaps, positioning nubs, screws, bolts, clips, tongue and groove arrangements, etc. In one non-limiting designed, the bottom surface of the grommet includes at least one positioning stub that is designed to be inserted into a hole in the housing of the engine driven device. The positioning stub is designed to at least partially ensure that the grommet is properly positioned about the tube access opening. The positioning stub also facilities in reducing movement of the grommet about the tube access opening which could compromise the sealing effect of the grommet. The positioning stub can include at least one groove and/or rib that is at least partially designed to inhibit or prevent the stub from inadvertently releasing from the hole in the housing. In another and/or alternative aspect of this embodiment, the grommet includes an access opening flange that is designed to extend downwardly into the tube access opening when the grommet is positioned and secured over and in the tube access opening. The size and shape of the flange is typically selected to closely match the size and shape of the tube access opening. Typically the size and shape of the flange is selected to form a partial or fully seal between the flange and the tube access opening. The flange can include at least one groove and/or rib that is at least partially designed to inhibit or prevent the flange from inadvertently releasing from tube access opening.

In accordance with still yet another and/or alternative aspect of the present invention, the grommet includes a side wall that rises upwardly from the base of the grommet and forms an internal cavity. The side wall generally rises about 0.2-5 inches, and typically about 0.5-1.5 inches; however, other lengths can be used. The internal cavity is designed to capture and direct fluids that inadvertently spill during the fueling of the engine welding. Such spills can occur when an operator maintains fuel flow through a fueling nozzle when the inserting or removing the nozzle from the opening of the top fill section on the filler tube. The captured fuel in the internal cavity is typically directed to one region of the grommet to enable the captured fuel to flow off the upper surface of the grommet. When the grommet is located on the top surface of the engine welder housing, the grommet typically causes fluids captured in the internal cavity to be directed to and over a side of the housing that is positioned closely adjacent to the tube access opening. In one embodiment of the invention, the internal cavity includes a lip that is designed to at least partially direct fuel or other liquids over and/or away from the side of the engine driven device. As such, the lip facilitates in the removal of fluids in the internal cavity of the grommet. The lip can also be designed to reduces the amount of liquid that travels down the side of the housing of the engine welder. In one embodiment of the invention, the lip extends at least partially over the side of the housing when the grommet is positioned about a tube access opening located in the top of the housing. The lip can be designed to extend outwardly from the side of the housing. When the lip extends outwardly from the side of the housing, the lip generally extends about 0.0625-3 inches. In another and/or alternative embodiment of the invention, the internal cavity of the grommet at least partially slopes downwardly and toward a side of the housing of an engine welder when the grommet is positioned about the tube access opening of the housing. The downward slope facilitates in causing fluids which spill into the internal cavity of the grommet to controllably flow out of the internal cavity and over and/or out from the side of the housing of the engine welder so as to reduce the amount of stagnate fluid in the internal cavity of the grommet. In one aspect of this embodiment, the angle of slope is about 1-20°. In another and/or alternative aspect of this embodiment, when the internal cavity includes a lip, the lip is also sloped. In one non-limiting design, the lip has the same slope as the slope in the other regions of the internal cavity. In another non-limiting design, the lip has a different slope from the slope in the other regions of the internal cavity.

In accordance with a further and/or alternative aspect of the present invention, the grommet is made up of one or more materials to satisfy the durability needs and versatility needs of the grommet. In one embodiment of the invention, the grommet is made of a material that is flexible and resists degradation by petroleum products. In one aspect of this embodiment, the grommet includes, but is not limited to, rubber, plastic and/or various types of composite materials. In another and/or alternative embodiment, the grommet is a one-piece structure.

In accordance with still a further and/or alternative aspect of the present invention, the internal cavity of the grommet includes a tube opening which provides access to at least a region of the top portion of the filler tube or a portion of the top fill section on the filler tube. In one embodiment of the invention, when the grommet includes an access opening flange, the tube opening extends into the central region defined by the an access opening flange. In another and/or alternative embodiment of the invention, the tube opening has a generally circular shape. As can be appreciated, other non-circular shapes can be used. In still another and/or alternative embodiment of the invention, a sealing structure which is positioned about the tube opening and is designed to at least partially form a seal about the region of the top portion of the filler tube or the portion of the top fill section that passes upwardly through the tube opening when the grommet is position about the tube access opening on the engine welder housing. The sealing structure is designed to at least partially inhibit or prevent fluids, which spill into the grommet from seeping through the tube and into the housing of the engine welder. In one aspect of this embodiment, the sealing structure includes a flexible flap. The flexible flap is designed to at least partially engage at least a portion of the filler tube or portion of the top fill section. In one non-limiting design, the flexible flap slopes upwardly from the tube opening. The upward slope exists prior to the grommet being inserted about the tube access opening. This upward sloping arrangement of the flexible flap facilitates in ensuring that a proper seal is formed at least about a portion of the filler tube or portion of the top fill section when the grommet is inserted about the tube access opening. In another non-limiting design, the flexible flap has an angle of slope of about 5-50°. This angle may or may not increase when the flexible flap is inserted at least about a portion of the filler tube or portion of the top fill section. In still another non-limiting design, the thickness of at least a portion of the flexible flap is variable such that the portion of the flexible flap that is designed to engage the filler tube or top fill section is thinner than other portions of the flexible flap. Such variable thickness facilitates in the flexibility of the flexible flap when being inserted at least about a portion of the filler tube or portion of the top fill section. In yet another non-limiting design, the thickness of the flexible flap is substantially constant. Instill yet another non-limiting design, the smallest cross-sectional opening area formed by the flexible flap is smaller than the portion of the filler tube or portion of the top fill section passing through the opening in the flexible flap so as to cause the sealing structure to at least partially stretch and/or bend about at least a portion of the surface of the filler tube or portion of the top fill section to form a substantially tight fit and seal.

The principal object of the present invention is to provide a fueling assembly which facilities in the fuel procedure of an engine welder.

Another and/or alternative object of the present invention is to provide a fueling assembly which is easy to service and install.

Yet another and/or alternative object of the present invention is to provide a fueling assembly which has proper sealing, and which minimizes or prevents fluids from contaminating the interior of the engine driven device.

Still another and/or alternative object of the present invention is to provide a fueling assembly which minimizes damage to the fueling assembly components during the operation of the engine driven device.

Still yet another and/or alternative object of the present invention is to provide a fueling assembly which includes a fuel gauge to monitor fuel levels in a fuel tank.

A further and/or alternative object of the present invention is to provide a fueling assembly which includes a fuel gauge having a fuel indicator that registers a plurality of fuel levels within the fuel tank of the fuel assembly.

Another and/or alternative object of the present invention is to provide a fuel assembly which includes a fuel gauge that operates when the engine welder is in use and when not in use.

Still another and/or alternative object of the present invention is to provide a fuel assembly which includes a fuel gauge that has an auxiliary power supply.

Yet another and/or alternative object of the present invention is to provide a fuel assembly that enables an operator to fill a fuel tank and simultaneously monitor the fuel gauge.

Still yet another and/or alternative object of the present invention is to provide a fuel assembly having a visual and/or audible fuel gauge and/or alarm.

A further and/or alternative object of the present invention is to provide a fuel assembly which includes a grommet that forms a fluid seal in a tube access opening of an engine driven device.

Still a further and/or alternative object of the present invention is to provide a fuel assembly which includes a one-piece grommet that can be connected to the top of the housing of the engine driven device.

Yet a further and/or alternative object of the present invention is to provide a fuel assembly which includes a grommet having a flexible flap which forms a seal with components of the fueling assembly that protrude through the grommet.

Still yet a further and/or alternative object of the present invention is to provide a grommet having a sloped surface which facilitates in the flow of flows out of the grommet.

Another and/or alternative object of the present invention is to provide a fueling assembly which includes a grommet having a positioning stub to position a portion of the grommet in the tube access opening and/or to maintain in position the grommet in the tube access opening.

Still another and/or alternative object of the present invention is to provide a fueling assembly which includes a grommet that directs fluid over and/or away from the side of an engine driven device.

Yet another and/or alternative object of the present invention is to provide a fueling assembly which includes a grommet having a lip that extends over or outwardly from the housing of the engine drive device.

These and other objects and advantages of the invention will become apparent to those skilled in the art upon reading and following this description taken together with the accompanying drawings.

BRIEF DESCRIPTION OF THE DRAWINGS

Reference may now be made to the drawings which illustrate various embodiments that the invention may take in physical form and certain parts and arrangements of parts wherein:

FIG. 1 is a transverse cross-sectional view of a housing of an engine welder showing a grommet a fuel assembly in accordance with the present invention;

FIG. 1A is a longitudinal cross-sectional view taken along line 1A-1A of FIG. 1;

FIG. 7 is a front exploded perspective view of the grommet in relation to the top section of the housing of the engine welder;

FIG. 8 is a view similar to FIG. 3 showing a modification of the grommet;

FIG. 14 is a transverse cross-sectional view of the fuel assembly showing a modification of a filler tube in accordance with the present invention;

FIG. 15 is a cross-sectional view taken along line 15-15 of FIG. 14; and, FIG. 16 is a cross-sectional view taken along line 16-16 of FIG. 14.

DETAILED DESCRIPTION OF THE EMBODIMENTS

Figure 2:
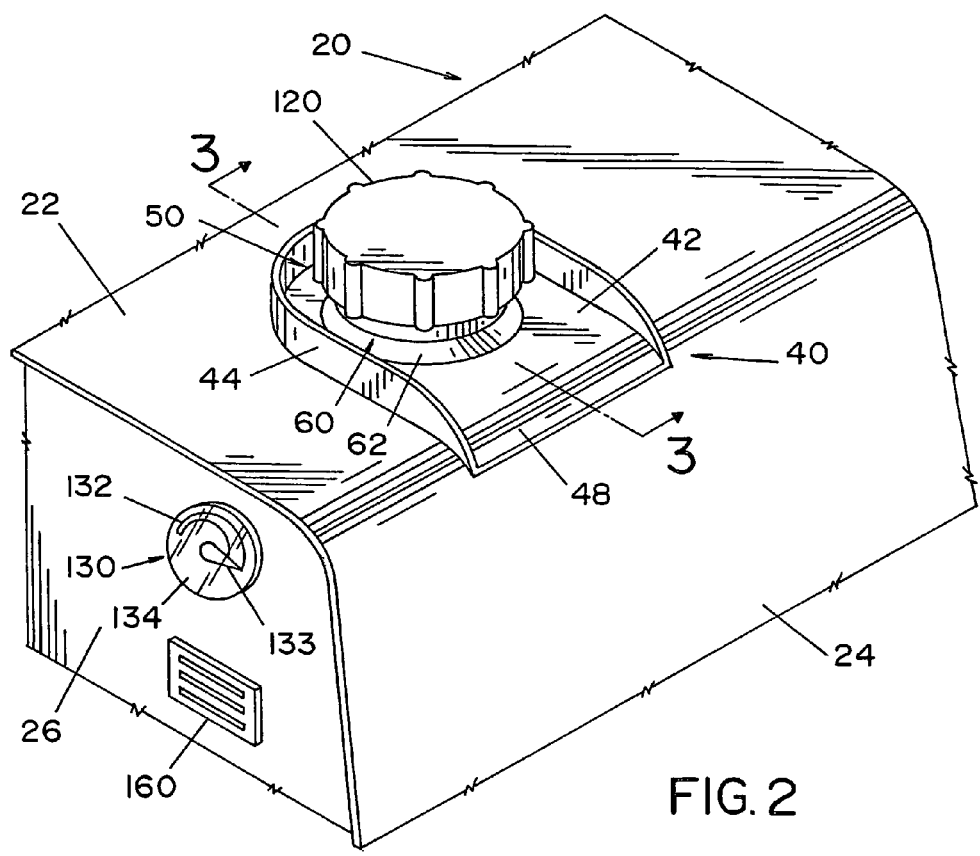
FIG. 2 is a perspective view of the top section of the housing of the engine welder illustrating the position of the grommet on the top of the housing.

Referring now to the drawings, wherein the showings are for the purposes of illustrating the preferred embodiments of the invention only and not for the purpose of limiting the same, FIG. 1 illustrates a portion of a cross-section of housing 20 which is secured to a typical engine welder or other engine driven device, not shown. Housing 20 includes a top region 22 and two side regions 24 and 26. The housing is designed to encase at least a portion of the internal components of the engine welder or other engine driven device. Typically positioned in top region 22 of the housing is an exhaust pipe opening, not shown, and a motor access opening, not shown. The housing is typically secured by bolts, screws or other means to the frame of the engine welder or other engine driven device. The configuration of the exhaust pipe opening and motor access opening are well known in the art and are disclosed in U.S. Pat. Nos. 5,928,535; 6,172,332; 6,263,926; and 6,296,027, which are incorporated herein by reference.

Positioned in the top region 22 of the housing 20 is a grommet 40. Grommet 40 is positioned in the tube access opening 36 of the housing 20 as illustrated in FIG. 7. Tube access opening 36 is formed by a cut-out section of the top section of the housing. The tube access opening is positioned closely adjacent to, but spaced from, a side 24 of housing 20 and the front panel 26 of the engine welder. The tube access opening is typically positioned in the housing such that over a majority of the tube access opening is positioned in the top region of the housing; and more typically about 75-100 percent of the tube access opening is positioned in the top region of the housing. As illustrated in FIG. 1, the tube access opening is positioned fully in the top region of the housing. As shown in FIG. 1, grommet 40 is inserted into tube access opening 36 and seals the tube access opening to inhibit or prevent fluids from entering the interior of the housing.

As best shown in FIG. 1, a fuel tank 90 is positioned and secured in the base of the engine welder or engine driven device. Fuel tank 90 supplies fuel to the fuel powered motor, not shown, in the engine welder or engine driven device. Positioned on the top region of fuel tank 90 is a filler tube 100 which extends upwardly from fuel tank 90 and to tube access opening 36 in housing 20. Filler tube 100 includes side walls 102. The side wall 102 is formed in such a manner to be positioned about the internal components within the engine welder or engine driven device. Filler tube 100 and fuel tank 90 are shown to be made of a one-piece material; however, filler tube 100 can be connected to the fuel tank in other arrangements (e.g. weld, solder, adhesive, etc.). The filler tube is also illustrated as being formed from a single piece of material; however, the filler tube can be formed from multiple components. The fuel tank and filler tube are made of durable materials (e.g., metal, plastic, etc.) The fuel tank and filler material can be made of the same or different materials.

The filler tube includes a top portion 104 and a bottom portion 106. Generally the top 40-60 percent of the longitudinal length a of filler tube defines the top portion of the filler tube and the lower 40-60 percent of the longitudinal length a of the filler tube defines the bottom portion of the filler tube. As shown in FIG. 1, the division of the top portion and bottom portion is indicated by a dashed line which shows that the top half of the longitudinal length a of the filler tube defines the top portion of the filler tube and the lower half of the longitudinal length a of the filler tube defines the bottom portion of the filler tube. The shape of the filler tube is shown to be generally conical shaped; however, many other shapes can be used. The base of the filler tube has a larger diameter than top of the filler tube. The diameter of the filler tube is shown to constantly decrease from the bottom to the top of the filler tube. As a result, bottom portion of said filler tube has a cross-sectional area that is greater that any region in the top portion of the filler tube. The volume of the bottom portion of the filler tube is also greater than the top portion of the filler tube. Generally the volume of the bottom portion of the filler tube to the fuel tank is at least about 1.2 times greater that the volume of the top portion of the filler fuel tube, and typically the volume of the bottom portion is about 1.4-3 times the volume of the top portion of the filler tube. In addition, the largest cross-section area in the bottom portion of the filler tube is generally at least about 1.2 times greater that the smallest cross-section area in the top portion of the filler tube, and typically the largest cross-section area in the bottom portion of the filler tube is about 1.5-6 times greater that the smallest cross-section area in the top portion of the filler tube. The large cross-sectional area and volume of the bottom portion of the filler tube is designed to reduce the rate at which the fuel rises in the filler tube after the fuel tank has been filled. The design of the filler tube is a significant improvement over prior filler tube designs. The reduced rate that the fuel rises in the filler tube during the filling of the filler tube with fuel allows an operator more time to terminate the flow of fuel into the filler tube once the operator is notified or learns from the fuel level indicator that the fuel tank is filled.

The top portion 102 of the filler tube includes a top fill section 110. The top fill section can be formed at the end of the filler tube or be connected to the top end 108 of the top portion of the filler tube by a weld, solder, adhesive or the like. As illustrated in FIG. 1, the top end 108 of the top portion is positioned closely adjacent to and slightly below the tube access opening. As can be appreciated, the filler tube can be designed such that the top end extends to or above the tube access opening. The top fill portion includes threads 112 that are designed to removably secure a cap 120 to the top of top fill portion. The top fill portion also includes an opening 114 that is designed to receive a fuel nozzle, not shown, to fill the fuel tank with fuel. As illustrated in FIG. 1, the top fill section extends above the tube access opening and grommet 40. The lower threads on the top fill portion also extend above the tube access opening and the grommet so that cap 120 can be easily secured to and removed from the top fill section.

Figure 9:
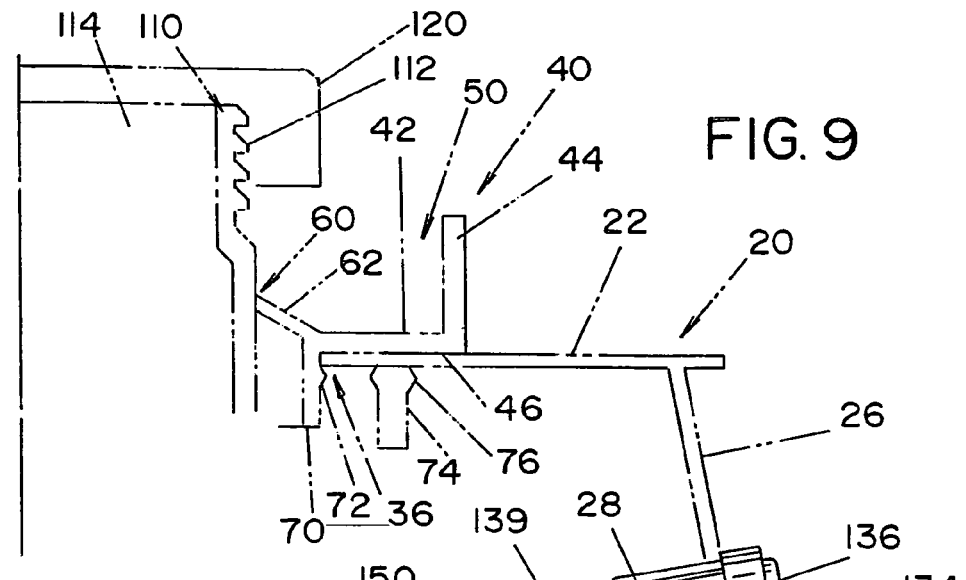
FIG. 9 is a longitudinal sectional view of the housing illustrating the location of the fuel level indicator on the front panel of the housing.
Figure 10:
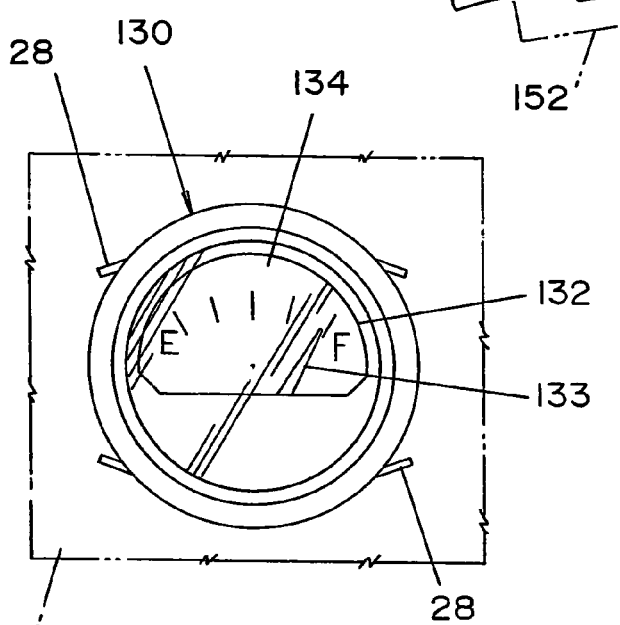
FIG. 10 is a front view of the fuel level indicator.
Figure 11:
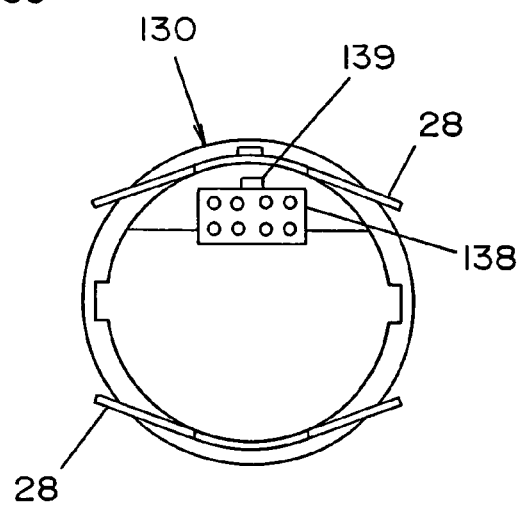
FIG. 11 is a rear view of the fuel level indicator.
Figure 12:
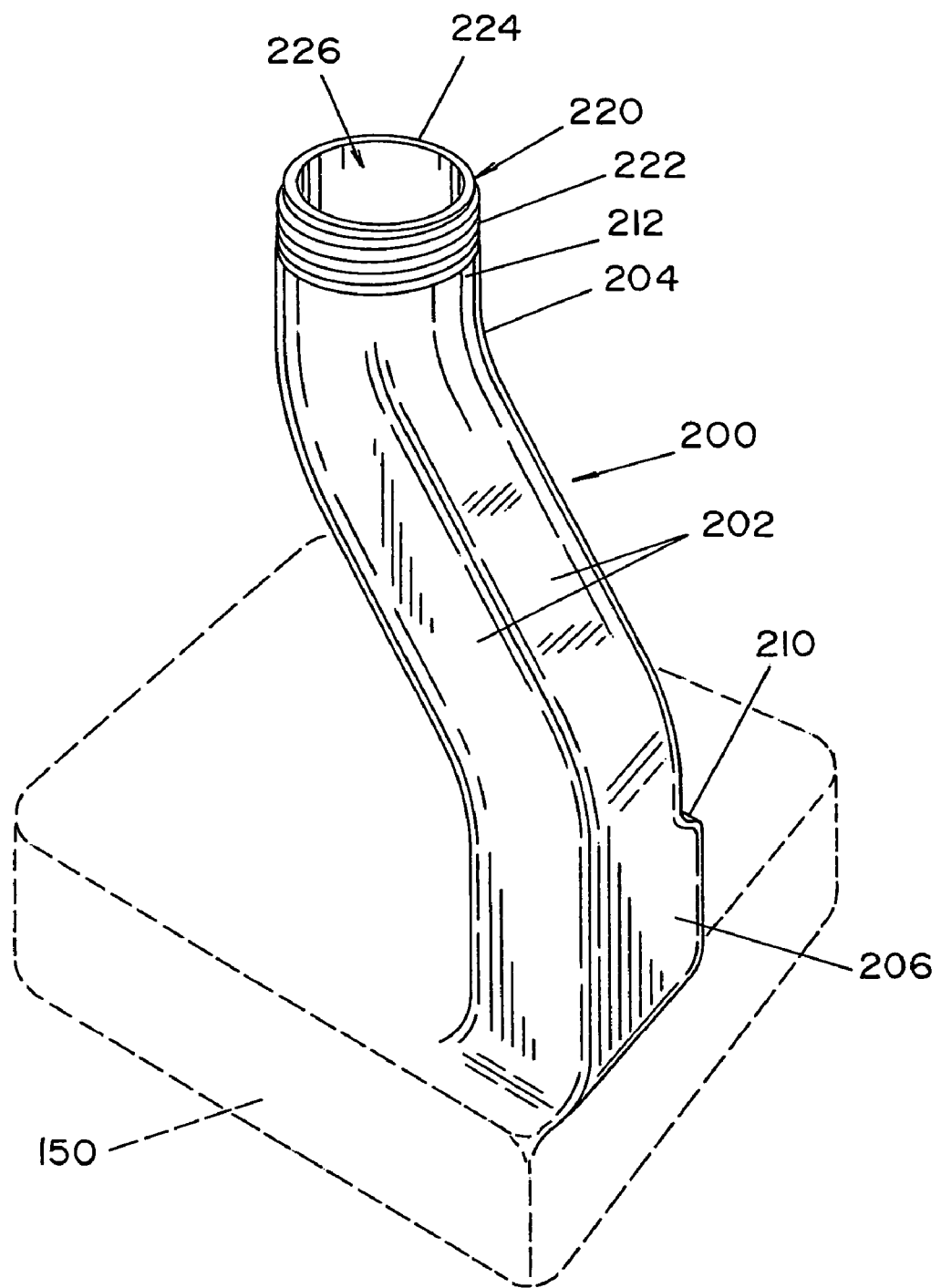
FIG. 12 is a front perspective view of another filler tube configuration in accordance with the present invention.
Figure 13:
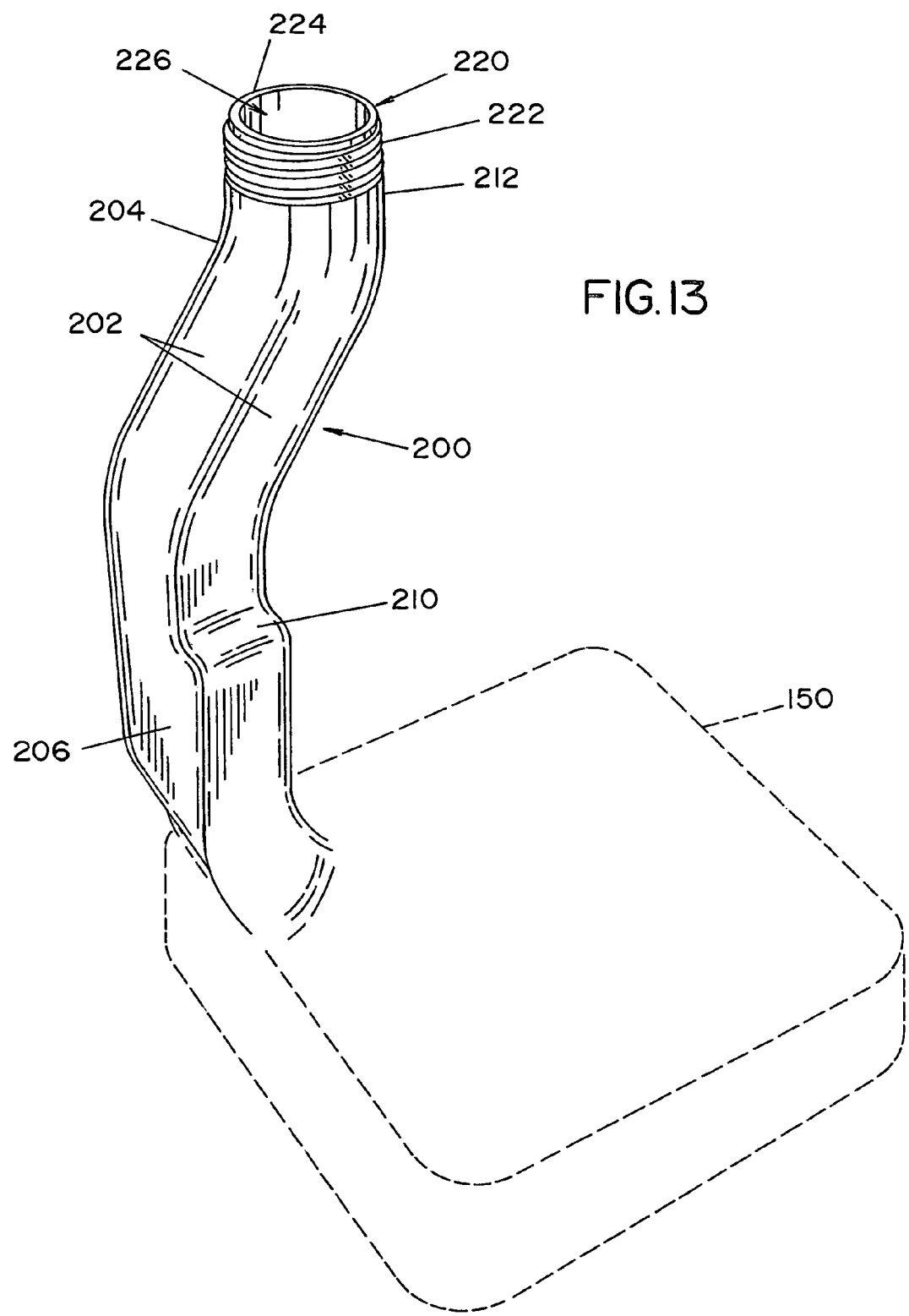
FIG. 13 is a rear perspective view of a filler tube in FIG. 12.

As shown in FIG. 1A, a fuel level monitor is used to indicate the level of fuel in the fuel tank. The fuel level monitor includes a fuel gauge 130 and a fuel level sensor 140. The fuel level sensor is located in the fuel tank and is designed to measure one or more fuel levels in the fuel tank. The fuel level sensor is illustrated as having a base probe 142 extending slightly into the fuel tank. The base probe is used to detect the level of fuel F in the fuel tank and transmit a signal via wire 150 to the fuel gauge 130. As can be appreciated, the base probe can be designed to extend any distance into the fuel tank to obtain the designed fuel level measurements in the fuel tank. As can also be appreciated, the fuel level sensor can be alternatively positioned in the filler tube or an additional fuel level sensor can be positioned in the filler tube. The fuel level sensor can be designed to use mechanical, chemical and/or electrical means to detect a fuel level. As illustrated in FIGS. 1A, 2 & 9, the fuel gauge is located in the front panel of the engine welder. The fuel gauge includes a meter 132 having a pointer 133 that indicates the level of the fuel in the fuel tank. A clear protective cover 134 (e.g. plastic, glass, etc.) is position over the meter to protect the internal components of the fuel gauge. The fuel level indicator provides the operator with information on the amount of fuel left in fuel tank, thereby providing the operator with information to determine whether a particular operation should be started and completed prior to the fuel in the fuel tank being exhausted. If an operator determines that the operation will take more time than the amount of fuel in the fuel tank can provide to run the engine, the operator can re-fill the fuel tank prior to operation so that the operation does not have to be prematurely terminated and restarted due to the engine running out of fuel. The fuel gauge can include a light to illuminate when one or more detected fuel levels in the fuel tank and/or filler tube are detected, or illuminate when the fuel level monitor is in operation. As shown in FIGS. 9 and 11, the fuel gauge includes ridges 136 that engage a clip structure 28 to secure the fuel gauge in the front panel of the engine welder. The back of the fuel gauge includes a set of connectors 138 to which wire 150 is connected. A rib 139 is positioned adjacent to the connector for facilitating in securing a connector housing 152 on the end of wire 150 to the connectors of the fuel gauge.

As shown in FIGS. 1A and 2, an audible alarm 160 is secured to the front panel of the engine welder. As can be appreciated, the audible alarm can be located in other locations on the engine welder (e.g., top of housing, back of housing, side of housing, etc.). A wire 162 is connected between the fuel gauge and the audible alarm. The audible alarm is designed to make a sound when one or more detected fuel levels in the fuel tank and/or filler tube are detected. The audible alarm can be designed to generate different sounds and/or sound levels for different detected fuel levels. The audible alarm can include a light to illuminate when one or more detected fuel levels in the fuel tank and/or filler tube are detected. The light, like sound, is used to drawn the operator's attention to the fuel gauge. The audible alarm is used to draw an operator's attention to the fuel gauge so as to notify the operator that a particular fuel level in the fuel tank has been reached and/or exceeded. During the fuel of the engine welder, the operator may become distracted. The audible alarm is useful in regaining the attention of the operator during the fueling process so that proper monitoring of the level of fuel in the fuel tank occurs during the fueling process. As can be appreciated, the audible alarm can be used as a back up monitor in the instances wherein the fuel gauge fails or provides an inaccurate fuel level reading.

The fuel level monitor illustrated in FIG. 1A is electrically powered. The fuel level monitor can be solely powered by the electricity generated by the engine welder during operation of the engine welder. Alternatively, the fuel level monitor can be solely powered by a separate power source (e.g., battery, solar cell, fuel cell, etc.). By powering the fuel level monitor by a separate power source, the engine welder does not need to be operating during the refueling of the fuel tank. Another alternative, which is illustrated in FIG. 1A, is the powering of the fuel level monitor by a combination of power sources. A battery 170 is positioned on the interior surface of the front panel. As can be appreciated, the battery can be located in other areas. The battery is connected by wire 172 to audible alarm 160; however, it can be appreciated that the wire from the battery can be connected to other or additional components of the fuel level monitor. A wire 174 is connected between the battery an another energy source (e.g. fuel cell, solar panel, electric generator in the engine welder, etc.), not shown. The fuel level monitor can utilize a circuit to control the power to the components of the fuel level monitor. The circuit can be used to 1) direct power to the fuel level monitor from the battery and the other energy source is used to recharge the battery, 2) direct power to the fuel level monitor from the other energy source and the battery is used a backup energy source when the other energy source fails, is not operating or is not operating to generate sufficient energy, or 3) direct power to the fuel level monitor from the other energy source and the battery is used a backup energy source when the other energy source fails, is not operating or is not operating to generate sufficient energy, and the other energy source is also used to recharge the battery. As can be appreciated, other circuit configurations can be used. As a result, by using a battery, the fuel level monitor can be operated when the engine welder is running or is not running.

Referring now to FIGS. 1-8, grommet 40 is designed to at least partially seal the tube access opening to inhibit or prevent fluids from entering the interior of the housing. The grommet is also designed to direct fuel that inadvertently spills into the grommet to a side of the engine welder.

Figure 3:
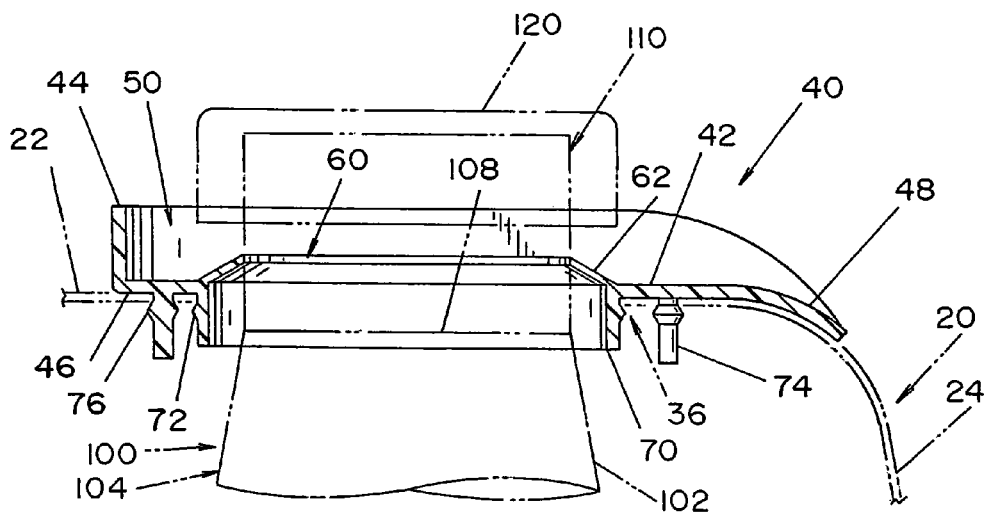
FIG. 3 is an enlarged cross-sectional view taken along line 3-3 of FIG. 2.
Figure 4:
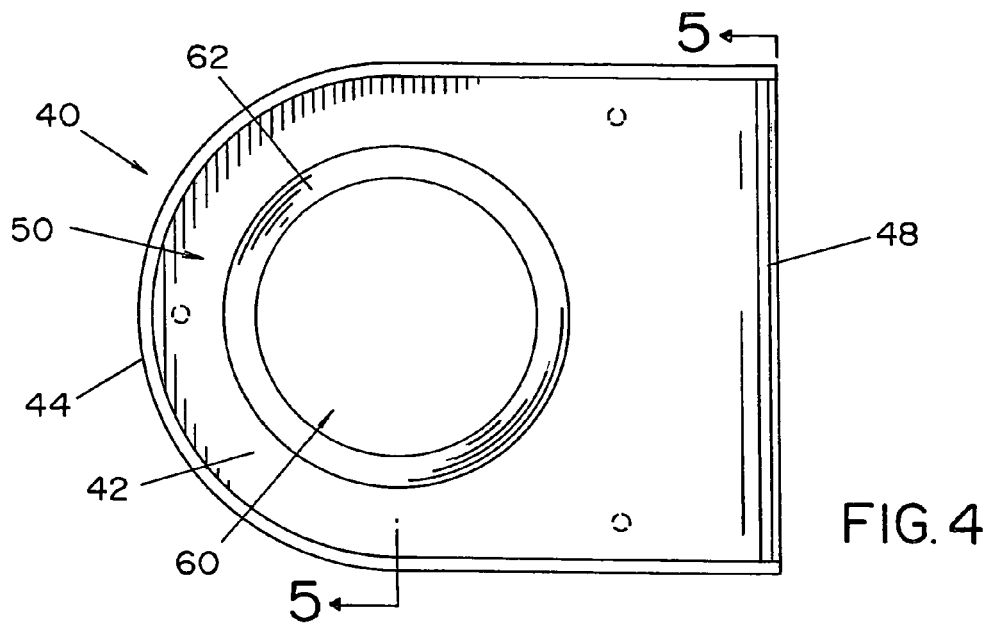
FIG. 4 is a top view of the grommet in accordance with the present invention.
Figure 5:
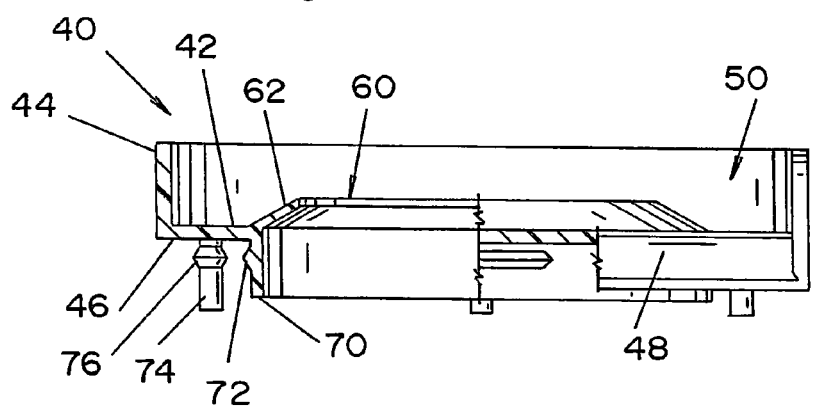
FIG. 5 is a cross-sectional view taken along line 5-5 of FIG. 4.
Figure 6:
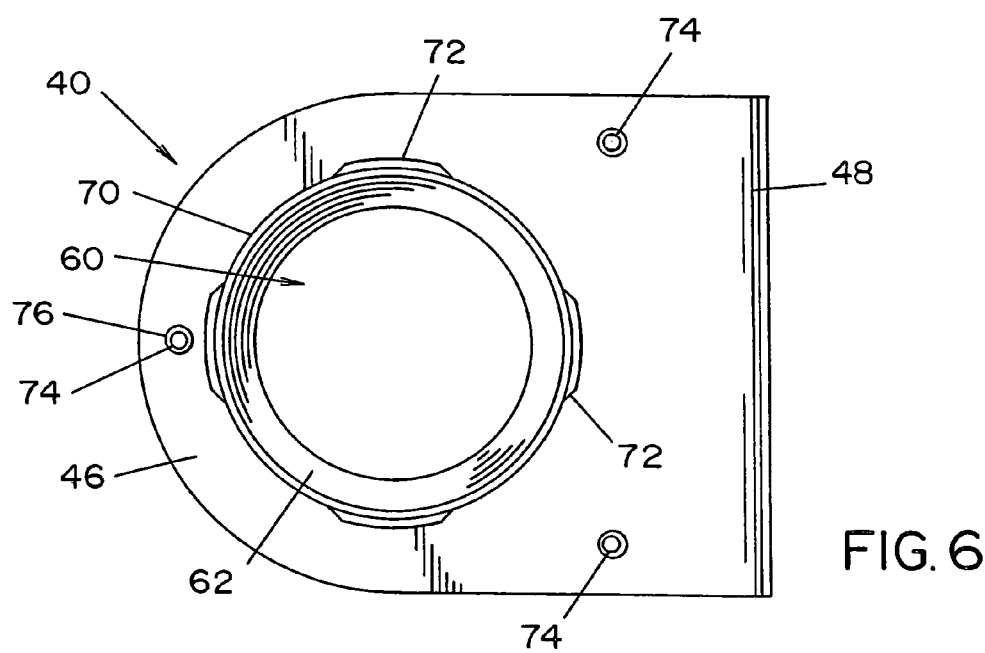
FIG. 6 is a bottom view of the grommet in accordance with the present invention.

The grommet is generally a one-piece structure made of a flexible material such as rubber. As can be appreciated, the grommet can be a multi-piece structure that is connected together by various means (e.g. heat, adhesive, etc.). As illustrated in FIGS. 4 and 7, grommet 40 includes a base surface 42 and a side wall 44 that extends about the outer perimeter of the grommet. The base surface and side wall for an internal cavity 50 in the grommet. A tube opening 60 is positioned in the base surface of the grommet. The tube opening is shown to be circular; however, other shapes can be used. The shape of the tube opening is selected to enable the top of the filler tube or top fill section to extend through the tube opening. Typically the tube opening closely matches the cross-section shape of the top of the filler tube or top fill section that extends through the tube opening. Positioned on the bottom side 46 of the grommet is an access opening flange 70 extending downward from the bottom surface. Positioned in the outer surface of the access opening flange 70 are one or more ribs 72 as shown in FIGS. 3, 5 and 6. The access opening flange that is designed to extend downwardly into the tube access opening when the grommet is positioned and secured over and in the tube access opening as illustrated in FIGS. 1, 3 and 8. The size and shape of the flange is typically selected to closely match the size and shape of the tube access opening. Typically the size and shape of the flange is selected to form a partial or full seal between the access opening flange and the tube access opening. The ribs on the access opening flange are designed to inhibit the flange from inadvertently releasing from tube access opening as illustrated in FIGS. 3 and 8. The bottom surface of the grommet includes a plurality of positioning stubs 74. The positioning stubs includes a rib 76. The positioning stubs are designed to be inserted into stub openings 29 in the top surface of the housing as illustrated in FIG. 7. The positioning stub is used to at least partially ensure that the grommet seals properly about the tube access opening. The positioning stub also facilities in reducing movement of the grommet about the tube access opening which could compromise the sealing effect of the grommet. The rib on the positioning stub is at least partially designed to inhibit or prevent the stub from inadvertently releasing from the stub opening in the housing. The bottom surface of the grommet and the access opening flange function as dual seals to inhibit or prevent fluids from entering into the housing through the tube access opening. At least a portion of the bottom surface of the grommet is held downwardly and close to the surface of the housing by the positioning stubs thereby forming at least one partial seal so as to limit the amount of fluid that becomes entrapped under the grommet. The access opening flange forms the second seal to inhibit or prevent fluids that have flowed between the bottom surface of the grommet and the top surface of the housing from entering the housing through the tube access opening.

As illustrated in FIGS. 1-3 and 9, the top fill section 110 extends through tube opening 60 and above the base surface of the grommet. A seal flap 62 that is positioned on the base surface of the grommet and about the perimeter of the tube opening engages the outer surface of the top fill section to form a seal between the top fill section and grommet 40. The seal flap is shown to angle upwardly from the base surface of the grommet and toward the central axis of the tube opening. The upward angle is generally about 5-60°, and typically about 10-40°. The seal formed by the seal flap inhibits or prevents fluids from flowing through tube opening 60 in grommet 40. When grommet 40 is inserted into tube access opening 36, seal flap 62 is positioned about the top fill section. The shape and size of the seal flap is about the same size and shape as, or a lesser size and shape than the top fill section so that a seal and/or at least semi-stable connection is formed between the seal flap and the top fill section. The seal flap is generally flexible or semi-flexible to enable the seal flap to deflect slightly upwardly when the top fill section is passed through tube opening to ensure that a tight seal forms between the seal flap and the top fill section.

Grommet 40 is shown as including a lip 48. Lip 48 is formed at the end of the base surface 42. The lip is illustrated as partially curving over a side of the housing of the engine welder. The lip is designed to direct fluids that have inadvertently spilled into the grommet internal cavity to flow outwardly from the cavity and over the side of the side of housing 20. As such, the lip facilitates in the flow of fluids from the internal cavity of the grommet.

When grommet 40 is secured in tube access opening 36, the base surface slopes downwardly toward lip 72 as illustrated in FIG. 8. The sloped base surface causes fluids which have inadvertently spilled into the internal cavity of the grommet to flow out of the internal cavity and onto the lip and then over the side of the housing. The sloped surface also causes the fluid flowing from the internal cavity of the grommet to accelerate as the fluid approaches the lip. The faster moving fluid facilitates in the fluid flowing over the lip.

The fueling assembly of the present invention as described above has many advantages over prior fuel systems for engine welders. The unique configuration of the filler tube provides added time for an operator to terminate the fueling process after being notified that the fuel tank is full. The grommet used on the housing of the engine welder utilizes a plurality of seals to reduce the occurrences of fuel or other fluids inadvertently entering the interior of the housing. The unique positioning of the fuel gauge and the opening for fueling enables an operator to view the fueling gauge while filling the fuel tank. The location of the opening for fueling eliminates the problems associated with blind fueling that resulted when the opening was located on the side of the housing of the engine welder.

Figure 16:
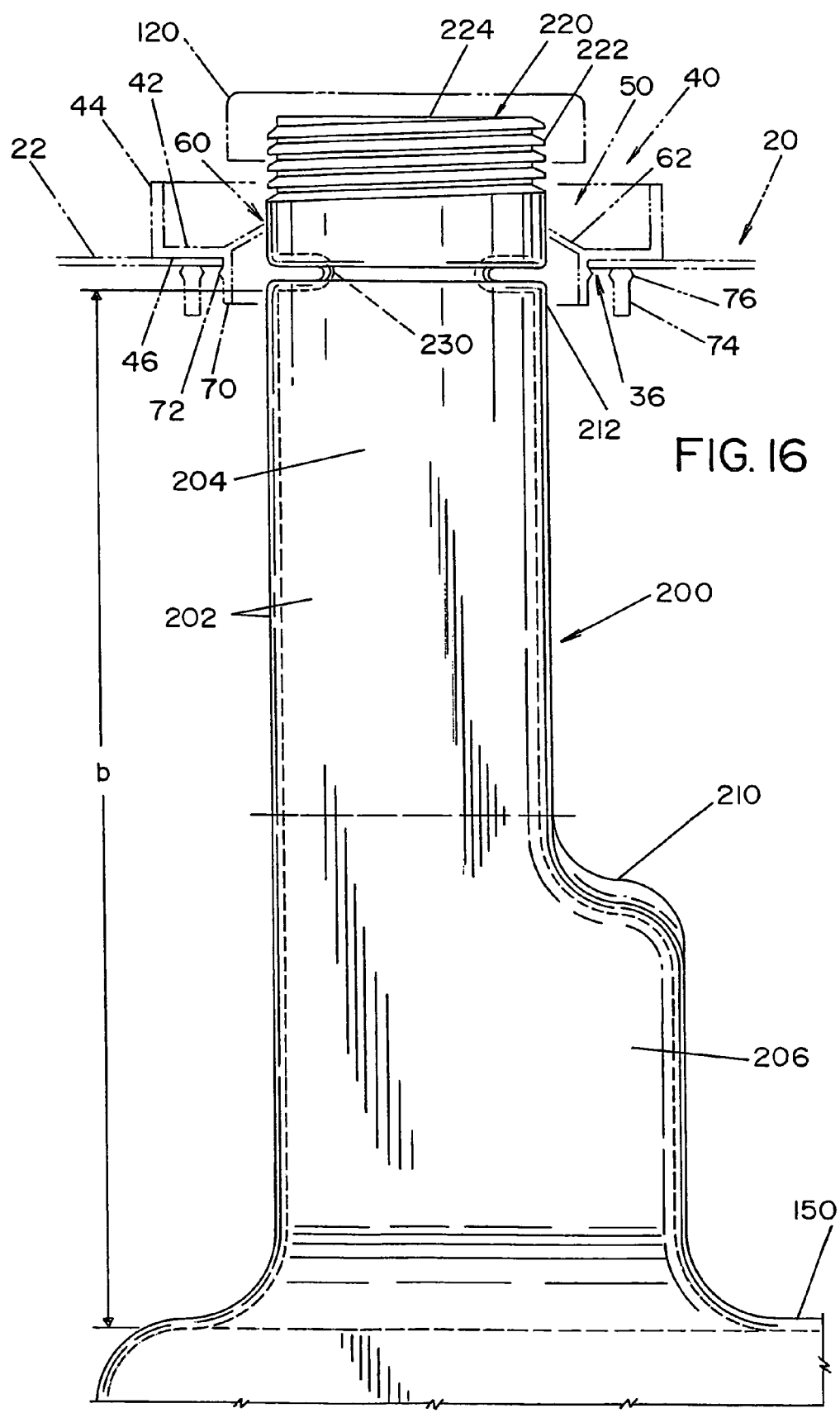

Another filler tube configuration is illustrated in FIGS. 12-16. The filler tube 200 is secured to a fuel tank 150. The filler tube can be formed as a one piece structure with the fuel tank or be connected to the fuel tank by a weld, solder, adhesive, etc. As best shown in FIGS. 14 and 16, filler tube 200 which extends upwardly from fuel tank 150 and to a point just below the tube access opening in the housing of the engine welder housing 20. Filler tube 200 includes side walls 202. The configuration of the filler tube is selected so that it can be positioned about the internal components of the engine welder or engine driven device. The filler tube is illustrated as being formed from a single piece of material; however, the filler tube can be formed from multiple components. The fuel tank and filler tube are made of durable materials (e.g., metal, plastic, etc.) The fuel tank and filler material can be made of the same or different materials.

The filler tube includes a top portion 204 and a bottom portion 206. Generally the top half of the longitudinal length b of the filler tube defines the top portion of the filler tube and the lower half of the longitudinal length b of the filler tube defines the bottom portion of the filler tube. As shown in FIG. 16, the division of the top portion and bottom portion is indicated by a dashed line. The cross-sectional shape of the filler tube is shown to be generally rectangular. The bottom portion of the filler tube has a larger diameter rectangular cross-sectional area than the rectangular cross-sectional area of the top portion. A majority of the bottom portion of the filler tube is shown to have a substantially constant cross-sectional area. Close to the top region of the bottom portion, the cross-sectional area tapers downwardly at a transition area 210 until obtaining the size of the cross-sectional area of the top portion. The cross-sectional area of the top portion is illustrated as being substantially uniform along the complete longitudinal length of the top portion. As a result, the bottom portion of said filler tube has a cross-sectional area that is greater that any region in the top portion of the filler tube. The volume of the bottom portion of the filler tube is also greater than the top portion of the filler tube. The large cross-sectional area and volume of the bottom portion of the filler tube is designed to reduce the rate at which the fuel rises in the filler tube after the fuel tank has been filled.

The top end 212 of top portion 204 of the filler tube includes a top fill section 220. The top fill section can be formed at the end of the filler tube or be connected to the top end of the top portion of the filler tube by a weld, solder, adhesive or the like. As illustrated in FIGS. 14 and 16, the top end 212 is positioned closely adjacent to and slightly below the tube access opening in the housing. The top fill portion includes threads 222 that are designed to removably secure a cap 120 to the top 224 of top fill portion. The top fill portion includes an opening 226 that is designed to receive a fuel nozzle, not shown, to fill the fuel tank with fuel. The top fill section extends above the tube access opening and grommet 40 as shown in FIGS. 14 and 16. The lower threads on the top fill portion also extend above the tube access opening and the base surface of the grommet so that cap 120 can be easily secured to and removed from the top fill section. The top fill section also includes a recess opening 230. The recess opening is used to facilitate in the holding a pump nozzle of a fuel pump in opening 226 of the top fill portion. The size of the recess opening is selected to accommodate certain types of fuel nozzles. Fuel nozzles for gasoline have a smaller nozzle diameter than fuel nozzles for diesel fuel. The recess opening can be formed by an insert placed in the top fill portion, can be formed as a one piece structure in the top fill section, or can be a separate piece that is connected to the base of the top fill section by a weld, solder, adhesive of the like.

The invention has been described with reference to a preferred embodiment and alternatives thereof. It is believed that many modifications and alterations to the embodiments disclosed readily suggest themselves to those skilled in the art upon reading and understanding the detailed description of the invention. It is intended to include all such modifications and alterations in so far as they come within the scope of the present invention.

We claim:

1. A fueling assembly for a fuel tank positioned at least closely adjacent to a base of an engine driven welder, said engine driven welder including a housing having a top region with a tube access opening, and a fuel tank which supplies fuel to an engine; said fueling assembly including a filler tube, said filler tube including a bottom portion, top portion and a top fill section connected to the top portion, said bottom portion of said filler tube having a cross-sectional area that is greater that any region in said top portion.

2. The fueling assembly as defined in claim 1, wherein said bottom portion includes a lower opening connected to said fuel tank, said top portion including a top opening connected to said top fill section, the cross-sectional area of said filler tube not increasing from the lower opening to said top fill section.

3. The fueling assembly as defined in claim 1, wherein said bottom portion is defined by a lower half of said filler tube and said top portion is defined by an upper half of said filler tube, said bottom portion having a volume that is at least about 1.2 times greater than a volume of said top portion.

4. The fueling assembly as defined in claim 2, wherein said bottom portion is by defined a lower half of said filler tube and said top portion is defined by an upper half of said filler tube, said bottom portion having a volume that is at least about 1.2 times greater than a volume of said top portion.

5. The fueling assembly as defined in claim 1, wherein the largest cross-section area in said bottom portion of said filler tube is at least about 1.5 times greater that the smallest cross-section area in said top portion of said filler tube.

6. The fueling assembly as defined in claim 4, wherein the largest cross-section area in said bottom portion of said filler tube is at least about 1.5 times greater that the smallest cross-section area in said top portion of said filler tube.

7. The fueling assembly as defined in claim 1, wherein said top fill section includes a recess opening to facilitate in holding a fuel nozzle in said top fill section.

8. The fueling assembly as defined in claim 6, wherein said top fill section includes a recess opening to facilitate in holding a fuel nozzle in said top fill section.

9. The fueling assembly as defined in claim 1, wherein at least about 75 percent of said tube access opening is positioned in said top region of said housing.

10. The fueling assembly as defined in claim 8, wherein at least about 75 percent of said tube access opening is positioned in said top region of said housing.

11. The fueling assembly as defined in claim 9, wherein at least about 95 percent of said tube access opening is positioned in said top region of said housing.

12. The fueling assembly as defined in claim 1, wherein said bottom portion constitutes about 40-60 percent of the lower longitudinal length of said filler tube.

13. The fueling assembly as defined in claim 1, wherein said bottom portion includes a lower opening connected to said fuel tank, said top portion including a top opening, the cross-sectional area of said filler tube not increasing from the lower opening to said top opening.

14. The fueling assembly as defined in claim 10, wherein said bottom portion constitutes about 40-60 percent of the lower longitudinal length of said filler tube.

15. The fueling assembly as defined in claim 14, wherein said bottom portion includes a lower opening connected to said fuel tank, said top portion including a top opening, the cross-sectional area of said filler tube not increasing from the lower opening to said top opening.

16. The fueling assembly as defined in claim 1, wherein said top fill section including a connector to removably secure a fuel cap over an opening in said top fill section.

17. The fueling assembly as defined in claim 1, wherein said top fill section including a recess opening to facilitate in holding a fuel nozzle in said top fill section.

18. The fueling assembly as defined in claim 15, wherein said top fill section including a connector to removably secure a fuel cap over an opening in said top fill section.

19. The fueling assembly as defined in claim 18, wherein said top fill section including a recess opening to facilitate in holding a fuel nozzle in said top fill section.

20. A fueling assembly for a fuel tank of an engine driven welder, said engine driven welder including a housing having a top region with a tube access opening, and a fuel tank which supplies fuel to an engine, at least a majority of said fuel tank positioned in a lower half of said housing; said fueling assembly including a filler tube, a fuel level monitor and a grommet, said filler tube including a bottom portion, top portion and a top fill section connected to the top portion, at least a portion of said top fill section extending above said tube access opening, said bottom portion of said filler tube having a cross-sectional area that is greater that any region in said top portion, said grommet at least partially sealing said tube access opening to inhibit fluids entering an interior of said housing.

21. The fueling assembly as defined in claim 20, wherein said bottom portion of said filler tube includes a lower opening connected to said fuel tank, said top portion of said filler tube including a top opening connected to said top fill section, said cross-sectional area of said filler tube not increasing from the lower opening to said top opening.

22. The fueling assembly as defined in claim 20, wherein said bottom portion of said filler tube is defined by a lower half of said filler tube and said top portion of said filler tube is defined by an upper half of said filler tube, said bottom portion having a volume that is at least about 1.2 times greater than a volume of said top portion.

23. The fueling assembly as defined in claim 21, wherein said bottom portion of said filler tube is defined by a lower half of said filler tube and said top portion of said filler tube is defined by an upper half of said filler tube, said bottom portion having a volume that is at least about 1.2 times greater than a volume of said top portion.

24. The fueling assembly as defined in claim 20, wherein a largest cross-section area in said bottom portion of said filler tube is at least about 1.5 times greater than a smallest cross-section area in said top portion of said filler tube.

25. The fueling assembly as defined in claim 23, wherein a largest cross-section area in said bottom portion of said filler tube is at least about 1.5 times greater than a smallest cross-section area in said top portion of said filler tube.

26. The fueling assembly as defined in claim 20, wherein said top fill section includes a connector to removably secure a fuel cap over an opening in said top fill section.

27. The fueling assembly as defined in claim 25, wherein said top fill section includes a connector to removably secure a fuel cap over an opening in said top fill section.

28. The fueling assembly as defined in claim 20, wherein said top fill section includes a recessed opening to facilitate in holding a fuel nozzle in said top fill section.

29. The fueling assembly as defined in claim 27, wherein said top fill section includes a recessed opening to facilitate in holding a fuel nozzle in said top fill section.

30. The fueling assembly as defined in claim 20, wherein at least about 75 percent of said tube access opening is positioned in said top region of said housing.

31. The fueling assembly as defined in claim 29, wherein at least about 75 percent of said tube access opening is positioned in said top region of said housing.

32. The fueling assembly as defined in claim 20, wherein said bottom portion constituting about 40-60 percent of the lower longitudinal length of said filler tube.

33. The fueling assembly as defined in claim 31, wherein said bottom portion constituting about 40-60 percent of the lower longitudinal length of said filler tube.

* * * * *